Jan. 8, 1963 K. J. PELTZ 3,071,884
VIBRASONIC FISHING LURE
Filed April 5, 1961
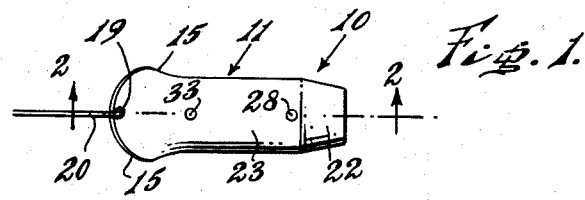
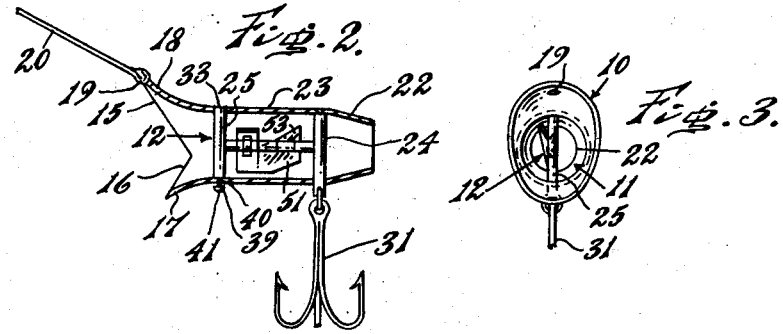
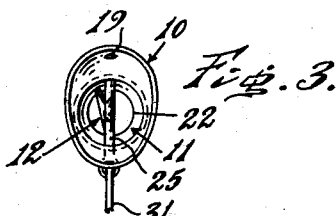
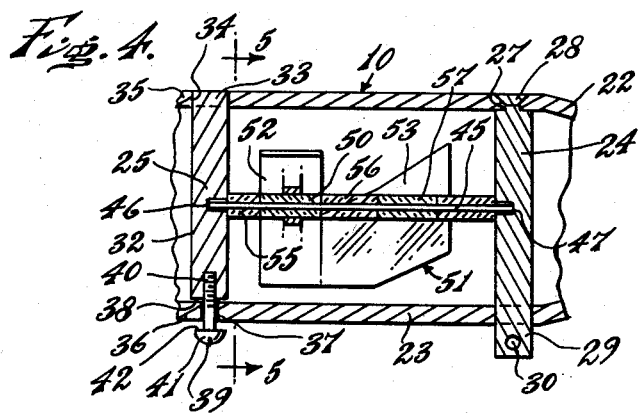
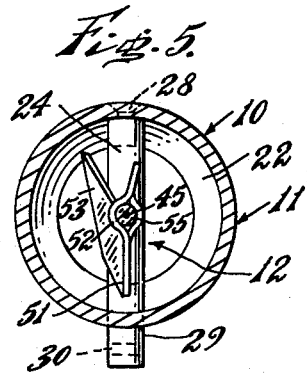
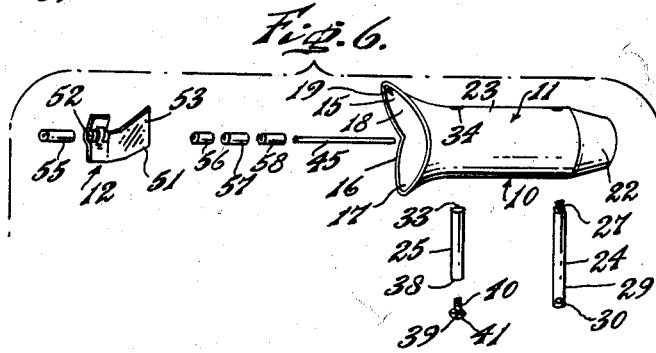
INVENTOR
Kenneth J. Peltz
BY Robertson + Voutie
ATTORNEYS

United States Patent Office 3,071,884
Patented Jan. 8, 1963

3,071,884
VIBRASONIC FISHING LURE
Kenneth J. Peltz, 2519 Dorothy St., Hatboro, Pa.
Filed Apr. 5, 1961, Ser. No. 100,887
7 Claims. (Cl. 43—17.1)

This invention relates generally to fishing lures, and is especially concerned with sonic or sound-producing fishing lures.

It is well-known that certain underwater sonic vibrations produce an attracting effect upon fish. Accordingly, it is one object of the present invention to provide a highly improved fish lure which automatically and continuously causes the radiation of sonic vibrations to effectively attract fish.

It is a further object of the present invention to provide a sonic fishing lure of the type described which includes a vane construction rotatable in response to fluid movement, wherein the vane rotation is translated to oscillatory shifting motion of sound-producing elements.

It is a further object of the present invention to provide a sonic fishing lure wherein an eccentrically weighted rotary vane is mounted by an oscillatory construction which includes engageable elements adapted to produce sound upon their abutting engagement.

The instant invention further contemplates the provision of a unique fish-lure body of tubular open-ended construction having one end flared and cut away, and having the other end tapered.

It is still a further object of the present invention to provide a fish-lure construction of the type described which is extremely simple in structure, entirely reliable in operation, durable throughout a long useful life, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a top plan view showing a fishing lure constructed in accordance with the teachings of the present invention;

FIGURE 2 is a longitudinal sectional view taken substantially along the line 2—2 of FIGURE 1;

FIGURE 3 is an end view, as seen from the right of FIGURE 2;

FIGURE 4 is an enlarged, partial sectional view similar to FIGURE 2;

FIGURE 5 is a transverse sectional view taken substantially along the line 5—5 of FIGURE 4; and FIGURE 6 is an exploded perspective view of the instant fish-lure construction.

Referring now more particularly to the drawings, the fish lure is there generally designated 10, and includes a hollow, tubular open ended body 11 which carries interiorly thereof a sound-producing mechanism, generally designated 12.

The body 11 may be formed of aluminum, or other metal or plastic, as desired, and has its forward end region 15 enlarged or flared. Opposite side edges of the forward end region 15 are cut out or cut way in an angulate or triangular configuration, as at 16. The angulate cutouts 16 are located in diametrically opposed relation on opposite sides of the tubular body 11, so as to leave the expanded forward end region 15 with a pair of vertically spaced, lower and upper extensions 17 and 18 defined of the body material between the cutouts. The upper extension 18 may be formed medially thereof adjacent to its forward edge with an opening or eye 19 for receiving a line 20.

The rearward region of the tubular body 11 may taper rearwardly, as at 22, to the open rear end. The medial region 23 of the body 11, between the flaring forward region 18 and tapering rearward region 22, may be substantially cylindrical.

The sound-producing mechanism 12 is located interiorly of the medial region 23, and includes a pair of generally parallel, normally vertical carrying members or posts 24 and 25, the former being proximate to the rear body region 22 and the latter proximate to the forward body region 18. Thus, the carrying members or posts 24 and 25 are spaced apart longitudinally of the body 11.

The rear post 24 may consist of a rod having a reduced end portion, as at 27 in FIGURE 4, received in the wall of body 11 and upset, as at 28 for fixed securement in the wall. The other end region 29 of the post or rod 24 depends through the opposite, lower wall region of body 11 where it may be provided with an opening or eye 30 for connection to a hook 31, see FIGURE 2.

The forward post 25 includes a rod 32 having its upper end region 33 slidably received in an opening 34 in the upper forward region 35 of medial body portion 23. Directly below the upper wall region 35 receiving the upper end of rod 32, and in diametrically opposed relation with the opening 34, there is provided in the lower forward region 36 of the medial body portion 23 a through hole or opening 37. The lower end 38 of rod 32 terminates interiorly of the body 11 proximate to and facing toward the body region 36, and is of a diameter greater than that of the hole 37. A fastener 39 has its shank 40 extending slidably upward through the hole 37 and upward into the rod 32 through the lower rod end 38. The shank 40 of fastener 39 may be in threaded engagement with the rod 32. On the lower end of shank 40 is an enlarged head 41 exteriorly of the body wall region 36.

It will now be appreciated that the post 25 is mounted for vertical, endwise shifting movement transversely of the body 11, the upper rod region 33 being slidably received in the opening 34 of the wall region 35, and the fastener 39 being slidably received in the opening 37 of the lower wall region 36. Further, vertical shifting movement of the rod 32 is limited in the downward direction by abutting engagement of the lower rod end 38 with the interior surface of the lower wall region 36, while upward shifting movement of the rod is limited by abutting engagement of the upwardly facing surface 42 of fastener head 41 with the under or exterior surface of wall region 36. Thus, the rod end surface 38 and the fastener-head surface 41 may be considered as abutment shoulders engageable with the wall region 36 to limit vertical oscillating movement of the rod 32 and produce sonic vibrations by their abutting engagement with the body.

Extending longitudinally of and within the medial region 23 of the body 11, between the posts 24 and 25, there is provided a shaft or axle 45. The shaft 45 is preferably generally coaxial with the body 11 and has it forward and rearward ends extending respectively into a rearwardly opening medially located hole 46 of the forward rod 32 and a medially located forwardly opening hole 47 of the rear rod 24. The shaft 45 may be rotatably supported at its ends in the receiving holes 46 and 47; or, the shaft may be nonrotatably supported by the posts 24 and 25. However, a slightly loose fit of the ends of shaft 45 in the holes 46 and 47 is preferred to permit the hereinbefore described vertical oscillation of forward post 25. However, the forward post could oscillate vertically without a loose reception of the shaft ends in the supporting posts, as by slight deflection of the shaft, if desired.

A journal sleeve 50 is freely rotatably circumposed about the shaft 45. Carried by the journal sleeve 50 is a vane 51 having a hub portion 52 secured to the sleeve 50 and a blade portion 53 extending from one side of the hub portion. Thus, the vane 51 is freely rotatably mounted by the sleeve 50 on the shaft 45, for rotation about the axis thereof. While only a single vane 53 is shown, the vane construction could employ a plurality of vanes, however it is essential that the vane construction 51 have its center of gravity offset on one side of or eccentric with respect to the axis of shaft 45.

To properly locate the vane construction 51 in spaced relation between the shaft-carrying members or posts 24 and 25, there may be provided suitable tubular spacers, such as at 55 between the hub 52 and rod 32, and a plurality of end-to-end aligned spacers 56, 57 and 58 circumposed about the shaft between the hub and the rear shaft-carrying member or post 24.

As illustrated, it is preferred that the vane 53 be of relatively great area, as may be accomplished by extending the vane generally helically about the axis of shaft 45. While the vane 53 may have the general configuration of a partial helix, it preferably extends considerably less than 360 degrees. This relatively flat, generally helical configuration of the vane 53 provides relatively great surface area for engagement with fluid passing through the body 11.

While operation of the instant fish lure is believed apparent from the foregoing description, a brief résumé follows. With a line 20 connected to the body 11 by the eye or opening 19, the body may be held or drawn so that water passes inward through the forward flared end region 15 of the body, through the sound-producing mechanism 12, and out from the rear tapering body region 22.

This flow of water causes the vane construction 51 to rotate, and as the vane construction is relatively light rotation occurs at an extremely high speed. Due to the offset or eccentrically located center of gravity of the vane construction 51, a centrifugal force is imparted to the shaft 45. However, as the shaft is supported at its rear end in the relatively fixed post 24, and supported at its forward end in the post 25 which is constrained to vertical or endwise movement, the centrifugal force is transmitted to the forward post in the form of high-speed vertical reciprocatory oscillation. As noted hereinbefore, this oscillation of the forward post 25, by abutting engagement of shoulders or faces 38 and 42 produces sonic vibrations in the body 11 which are radiated outward from the latter to attract fish.

From the foregoing, it is seen that the present invention provides a fish lure which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A fishing lure comprising an open body adapted to have water flow therethrough, a shaft arranged in the opening of said body longitudinally of the flow of water, spaced-apart shaft-carrying means mounted in said body and carrying said shaft in said body, at least one of said shaft-carrying means being mounted in said body for limited free shifting movement transversely of said shaft, and rotary-vane means carried by said shaft for rotation about the axis of said shaft responsive to said water flow, said vane means being eccentrically weighted to effect oscillatory shifting of said one said shaft-carrying means upon vane rotation and cause sonic vibration of said body.

2. A fishing lure according to claim 1, said body comprising an open-ended tubular member, and said one shaft-carrying means comprising a post extending transversely across and mounted for endwise shifting in said tubular member, and abutment means on said post engageable with said tubular member to limit post shifting movement and produce said sonic vibrations.

3. A fishing lure according to claim 1, said vane means comprising at least one vane on said shaft and having its center of gravity on one side of said shaft.

4. A fishing lure comprising an open-ended tubular body adapted to have fluid flow therethrough, a pair of shaft-carrying members mounted in said body at locations spaced longitudinally of said body, at least one of said shaft-carrying members being mounted in said body for oscillation transversely of said body, a shaft extending between and mounted by said shaft-carrying members, said shaft being movable transversely with said one shaft-carrying member upon oscillation of the latter, and a vane construction mounted on said shaft for rotation about the axis thereof upon fluid flow through said body, said vane construction having its center of gravity offset from said shaft axis to effect transverse shaft movement and oscillation of said one carrying member upon vane rotation.

5. A fishing lure according to claim 4, in combination with abutment means on said one carrying member engageable with said body to limit said shifting movement of said one carrying member, said abutment means producing sonic vibration upon engagement with said body.

6. A fishing lure according to claim 5, said one carrying member comprising a post having its opposite ends mounted in opposite wall regions of said tubular body for free shifting movement longitudinally of said post, and said abutment means comprising a pair of facing shoulders on said post and respectively located on opposite sides of one of said wall regions for limiting abutting engagement with said one wall region.

7. A fishing lure according to claim 6, said post including a rod extending between said opposite wall regions and having one end terminating short of said one wall region, and a headed fastener having its shank extending slidably inward through said one wall region and endwise into said one rod end, the other end of said rod being slidably received in the other wall region, whereby said one rod end and the head of said fastener define said abutment means.

References Cited in the file of this patent

UNITED STATES PATENTS

| | | |
|---|---|---|
| 2,027,069 | Sorenson | Jan. 7, 1936 |
| 2,353,360 | Ronning | July 11, 1944 |
| 2,624,145 | Wehn | Jan. 6, 1953 |
| 2,748,522 | Mulcahey | June 5, 1956 |
| 2,977,705 | Busnel | Apr. 4, 1961 |